United States Patent Office 2,823,478
Patented Feb. 18, 1958

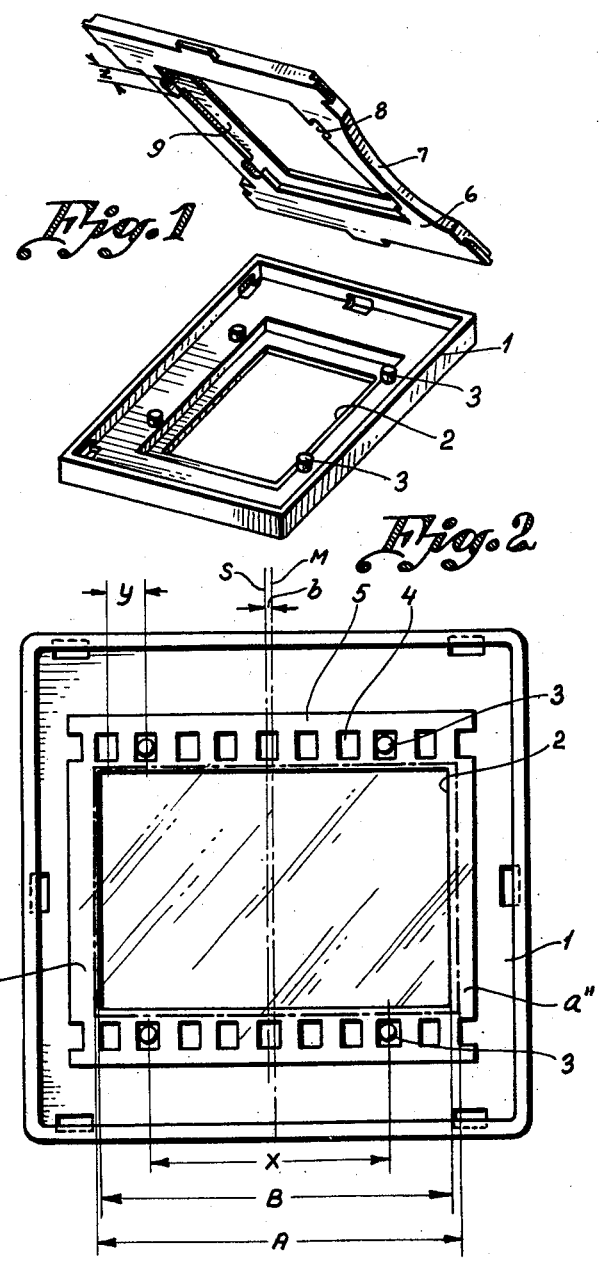

2,823,478

FILM STRIP MOUNT

Bent Högsbro Östergaard, Thorstruphus pr. Sig, Knud Högsbro Östergaard, Aastrup pr. Glejbjerg, and Godtfred Kirk Christiansen, Billund, Denmark Application November 23, 1954, Serial No. 470,772

Claims priority, application Denmark November 28, 1953

2 Claims. (Cl. 40—152)

This invention relates to a device of the kind generally referred to as a transparency mount and more particularly to a holding frame for mounting picture-carrying perforated film strips for viewing or for optical projection.

Known transparency mounts of this kind comprising a holding frame provided with an aperture or window and a pair of projections or fastening pins at either side of said aperture adapted to engage a pair of holes in the film strip at either side thereof, so as to secure the film strip to the frame, have the disadvantage that, when the film is mounted on the frame, the outline of the picture on the film strip will not always coincide exactly with the outline of the window in the frame, unless the length of said window is reduced to such an extent that a substantial part of the picture surface is cut off.

Thus, when projecting the picture of a film strip mounted on the frame above the window therein, the enlarged picture projected on the screen may appear with a vertical white band or strip at the right hand or left hand side of the picture owing to the beam of light passing through the narrow slit formed between the vertical edges of the picture and the adjacent edges of the window in the frame.

This undesirable phenomenon is due to the fact that the location of the picture photographed on the film strip relatively to the perforations therein is subject to slight variations depending on the type of camera used for taking the pictures.

The object of the present invention is to eliminate this dislocation of the picture on the film strip relatively to the outline of the picture window without substantially reducing the length thereof by the simple expedient of co-ordinating the location of the fastening pins and the length of the picture aperture with the hole pitch of the side perforations in the film strip.

According to the invention, this coordination is achieved by displacing the median line between the two fastening pins in the lengthwise direction of the film relatively to the median line of the picture window by a distance equal to one quarter of the hole pitch and by reducing the length of the window relatively to the length of the picture on the film strip by one half of the hole pitch.

The invention will be fully understood from the following description with reference to the drawings in which:

Fig. 1 is a perspective view showing the main elements forming the mount, and

Fig. 2 is an enlarged plan view illustrating the relative dimensions and displacement of the film picture and the picture window according to the invention.

The film strip mount consists essentially of a holding frame 1 which may be made from a thermo-plastic material, a synthetic resin or any other mouldable material. This frame 1 is provided with an apertured recess 2 for receiving a glass plate (not shown) so as to form a picture window, and at either side of this picture window adjacent the lengthwise edges thereof the frame is provided with a pair of spaced apart upstanding fastening pins 3 adapted to engage a pair of holes 4 in the side perforations of the film strip 5 as shown in Fig. 2.

When the film has been placed in the position illustrated in Fig. 2 above the picture window, the frame 1 is closed by means of a cover or lid 6 provided with an apertured recess 9 for receiving a glass plate (not shown) and conforming in size and shape to the picture window 2 of the frame 1 and with four recesses 8 for receiving the four pins 3 when assembling the frame 1 and the cover 6 so as to sandwich the film strip 5 between the two glass plates. The cover 6 is further provided with an incision 7 for facilitating the correct location of the mount in the projecting apparatus.

Referring to Fig. 2 the hole pitch, that is to say the distance between the centerlines of two consecutive holes 4 in the side perforations of the film strip 5, is designated by $y$, and the distance between the pins 3 is designated by $x$. This distance is a multiple of the hole pitch $y$, i. e. $x=ny$, wherein $n$ is an integer. The length of the picture window 2 is designated by B, and the length of the film picture which is normally standardized at 36 millimeters is designated by A. Furthermore, the median line of the picture window 2 dividing the distance B into two halves is designated by M and the median line between the pins 3 dividing the distance $x$ into two halves is designated by S.

According to the invention the line S is displaced relatively to the line M by a distance $b=0.25y$, and the length B of the picture window is reduced relatively to the length A of the picture by one half of the hole pitch so that $B=A-0.5y$.

It will appear from Fig. 2 that with the arrangement of picture window relatively to the position of the pins 3 according to the invention it will always be possible to place the left hand and right hand edges $a'$ and $a''$ respectively of any picture on the film strip 5 in such a manner that they are masked off by the picture window 2 irrespectively of the position of the picture relatively to the holes 4 whilst simultaneously engaging two of the holes 4 at either side of the strip with their corresponding pins 3.

It will also be observed that the left hand edge $a'$ of the picture should be placed either in the position shown in Fig. 2, i. e. adjacent that edge of the picture window which is nearest to the line S or adjacent the opposite edge of the picture window, i. e. the edge thereof remote from the line S, depending on the displacement of the picture relatively to the holes 4 in the film strip 5.

Moreover, in view of these two possibilities as regards the location of the film strip 5 relatively to the frame 1 the length $z$ of the incisions 8 in the cover 6 should be at least one half of a hole pitch longer than the diameter of the pins 3, while the depth of said incisions 8 should be substantially equal to the diameter of the pins 3.

We claim:

1. A film strip mount comprising a holding frame and a cover for said frame, said frame having a picture window conforming in shape and size substantially to the picture area on a film strip having the usual perforations, said picture window having a length less than the film picture length by an amount equal to one-half of the pitch of the film perforations, said frame also having pairs of spaced apart fastening pins respectively at opposite sides of said picture window which are receivable respectively in spaced pairs of said perforations, said pairs of pins being disposed eccentrically in relation to the transverse center line of the picture window and the common median line between the pins of said pairs being spaced from said picture window center line by a distance equal to one-quarter of the pitch of the film strip perforations so that any position of the picture area on the film strip in relation to said perforations will coincide with the picture window and no light streaks will appear at the opposite side edges of the picture area when the picture area is viewed or optically projected, said cover having a window conforming in shape and size to the picture window in the frame, said cover also having provision for determining the correct location of the mount in a projecting apparatus so that the picture area will be disposed right side up.

2. A film strip mount comprising a holding frame having a picture window conforming in shape and size substantially to the picture area on a film strip having the usual perforations, said picture window having a length less than the film picture length by an amount equal to one-half of the pitch of the film perforations, said frame also having pairs of spaced apart fastening pins respectively at opposite sides of said picture window which are receivable respectively in spaced pairs of said perforations, said pairs of pins being disposed eccentrically in relation to the transverse center line of the picture window and the common median line between the pins of said pairs being spaced from said picture window center line by a distance equal to one-quarter of the pitch of the film strip perforations so that any position of the picture area on the film strip in relation to said perforations, whether the film strip is in an obverse or a reverse position in the mount, will coincide with the picture window and no light streaks will appear at the opposite side edges of the picture area when the picture area is viewed or optically projected, and a windowed cover which cooperates with said frame in retaining the film strip in position on said pins.

References Cited in the file of this patent

UNITED STATES PATENTS

| | | |
|---|---|---|
| 386,874 | Foltz | July 31, 1888 |
| 2,527,765 | Hoehrl | Oct. 31, 1950 |
| 2,528,366 | Houston | Oct. 31, 1950 |